(12) United States Patent
Fletcher et al.

(10) Patent No.: US 6,299,316 B1
(45) Date of Patent: Oct. 9, 2001

(54) ELECTRO-OPTIC REARVIEW MIRROR SYSTEM

(75) Inventors: Sean J. Fletcher, Dublin (IE); Kenneth Schofield, Holland, MI (US); Patrick J. Lawlor, Dublin (IE)

(73) Assignee: Donnelly Mirrors Limited, Naas (IE)

( * ) Notice: Subject to any disclaimer, the term of this patent is extended or adjusted under 35 U.S.C. 154(b) by 0 days.

(21) Appl. No.: 09/633,611

(22) Filed: Aug. 7, 2000

Related U.S. Application Data

(63) Continuation of application No. 09/155,040, filed as application No. PCT/IE97/00019 on Mar. 19, 1997, now Pat. No. 6,099,131.

(30) Foreign Application Priority Data

Mar. 19, 1996 (IE) .................................................. S960227

(51) Int. Cl.⁷ ...................................................... G02B 5/08
(52) U.S. Cl. ......................... 359/604; 605/607; 605/608
(58) Field of Search .................................. 359/604, 605, 359/607, 608; 701/33, 35, 29, 30, 102, 115, 123, 201

(56) References Cited

U.S. PATENT DOCUMENTS

| | | | |
|---|---|---|---|
| 5,659,423 | 8/1997 | Schierbeek et al. | 359/604 |
| 5,669,698 | 9/1997 | Veldman et al. | 362/83.1 |
| 5,790,973 | * 8/1998 | Blaker et al. | 701/123 |
| 5,812,321 | 9/1998 | Schierbeek | 359/601 |
| 5,883,605 | 3/1999 | Knapp | 345/7 |
| 5,938,321 | 8/1999 | Bos et al. | 362/494 |
| 5,971,552 | 10/1999 | O'Farrell | 359/871 |

FOREIGN PATENT DOCUMENTS

| | | |
|---|---|---|
| 3722348A | 10/1988 | (DE) . |
| 2366958 | 5/1978 | (FR) . |

OTHER PUBLICATIONS

Commonly assigned copending U.S. application entitled "Electro–Optic Rearview Mirror System," Ser. No. 09/155,040, filed Apr. 22, 1999, by Sean Fletcher et al.

International Search Report for International Application No. PCT/IE97/00019.

* cited by examiner

Primary Examiner—Mohammad Sikder
(74) Attorney, Agent, or Firm—Van Dyke, Gardner, Linn & Burkhart, LLP

(57) ABSTRACT

An electro-optic interior rearview mirror system is provided for a vehicle, comprising an interior rearview mirror assembly including an interior electro-optic reflective element and an interior mirror housing for said reflective element. The mirror assembly includes a mount for attachment to a portion of the vehicle and a control. The control includes a microprocessor that functions as a controller of a plurality of vehicle functions, the plurality of functions including the reflectance state of the electro-optic reflective element. The control includes a connection to a vehicle bus for receiving control signals via the bus for processing by the microprocessor.

23 Claims, 3 Drawing Sheets

ELECTRO-OPTIC REARVIEW MIRROR SYSTEM

CROSS REFERENCE TO RELATED APPLICATIONS

This is a continuation of prior application Ser. No. 09/155,040, filed on Apr. 22, 1999, now U.S. Pat. No. 6,099,131, which claims priority from international application No. PCT/IE97/00019, filed on Mar. 19, 1997, which claims priority from foreign application No. S960227, filed in Ireland on Mar. 19, 1996.

BACKGROUND OF THE INVENTION

This invention relates to an electro-optic rearview mirror system for a vehicle.

Electro-optic rearview mirrors are very well known in the art and include a mirror housing containing a variable reflectance electro-optic mirror unit. While many different constructions of variable reflectance electro-optic mirror units are known, a typical construction uses two substantially parallel glass plates, one of which (herein referred to as the rear place) is coated on one surface with a reflective layer (the other plate is referred to as the front plate). The front and rear plates are separated by a space which contains an electro-optic medium allowing variation in the amount of light transmitted through the medium by varying the strength of an electric field applied across the medium. For example, in liquid crystal rearview mirrors the space between the front and rear plates is filled with a semi-viscous liquid crystal material. In electrochemichromic or electrochromic mirrors, the space contains a liquid, thickened liquid, gel or semi-solid material.

The mirror unit is mounted in the mirror housing with the front plate facing the viewer, so that light. incident externally on the mirror unit returns to the viewer, after reflection at the rear plate, only after a double crossing of the electro-optic medium. Electrode means, for example a respective transparent electrode layer on each plate, permit varying the electrical field across the electro-optic medium, thereby to correspondingly vary the level of reflected light returned to the viewer and accordingly the reflectivity of the mirror unit as a whole.

In the simplest case the reflectivity of the mirror unit is switchable manually between a maximum appropriate for daylight use to a minimum appropriate for nighttime use where it is required to reduce the glare from headlights of following vehicles. However, it is also known to mount one or more light sensors in the mirror housing which sense the light levels forwardly and/or rearwardly of the vehicle and automatically adjust the reflectivity or the mirror unit according to selected criteria. Typical arrangements of the latter kind are described in U.S. Pat. Nos. 4,793,690, 4,799, 768, 4,886,960, 5,193,029, 5,140,455 and 5,151,816.

Hitherto, in all cases the control circuitry for the electro-optic mirror unit has been contained, usually on a printed circuit board (PCB), within the mirror housing itself.

However, this has substantial disadvantages. The mirror housing needs to be fairly bulky to accommodate the control circuitry, which is undesirable from an aesthetic point of view, and this is exacerbated by the current trend to located more and more function in the mirror housing such as a compass display, navigational display system and infra-red (IR) sensor for automatic locking system. Also, the control circuitry tends to generate substantial heat, often as high as 2–3 watts, which means the mirror housing has to be designed for adequate ventilation. Further, the mirror is complex to assemble and has a high replacement cost.

SUMMARY OF THE INVENTION

It is an object of the present invention to mitigate these disadvantages.

Accordingly, the invention provides an electro-optic rearview mirror system for a vehicle, comprising a mirror housing containing an electro-optic mirror unit, at least one light sensor for sensing the ambient light level outside the vehicle, and control circuitry responsive to signal(s) from the light sensor(s) to establish a drive voltage for the electro-optic mirror unit, where the control circuitry is located outside the mirror housing.

Preferably, the mirror housing is mounted interior of the vehicle.

The light sensor(s) may also be located in the mirror housing, but they may alternatively be located elsewhere in the vehicle where an adequate view of the ambient light level exterior of the vehicle can be obtained.

The control circuitry is preferably located in a header, which is a shallow housing mounted on the ceiling of the vehicle, preferably located behind the rearview mirror housing overhead and centrally between the driver and the front passenger seats.

An advantage of the invention is that the mirror housing does not require interior space to be allocated to the control circuitry and therefore the mirror housing can be reduced in size or, if desired, can accommodate extra functions, such as a compass display, navigational display system or infra-red (IR) sensor as referred to above, without unduly increasing the size of the housing.

Further, the heat generated in the mirror housing is reduced, and also the constructional complexity and replacement cost is reduced. Also, the reduction in components in the mirror, and the use of a black seal on the perimeter of the electro-optic element, permits a simpler assembly method to be used.

Preferably the control circuitry shares a processor which is used for other control functions of the vehicle. This has further advantages.

First, it allows additional functions contained in the mirror housing to be connected to a vehicle bus system 44' without the cost and complexity of adding a separate bus connection node in the mirror. Also, switches and indicators presently located in the mirror housing can be grouped in a central location with other controls. Further, there is the ability to have the electro-optic mirror sensitivity adjusted to customer preferences at dealer service intervals. Additionally, sensors and other features located in the mirror housing can be used for multiple functions, for example, the light sensors used for the electro-optic mirror unit can be used for automatic headlight control.

Embodiments of the invention will now be described, by way of example, with reference to the accompanying drawings, in which:

DESCRIPTION OF THE PREFERRED EMBODIMENT

Figure 1:
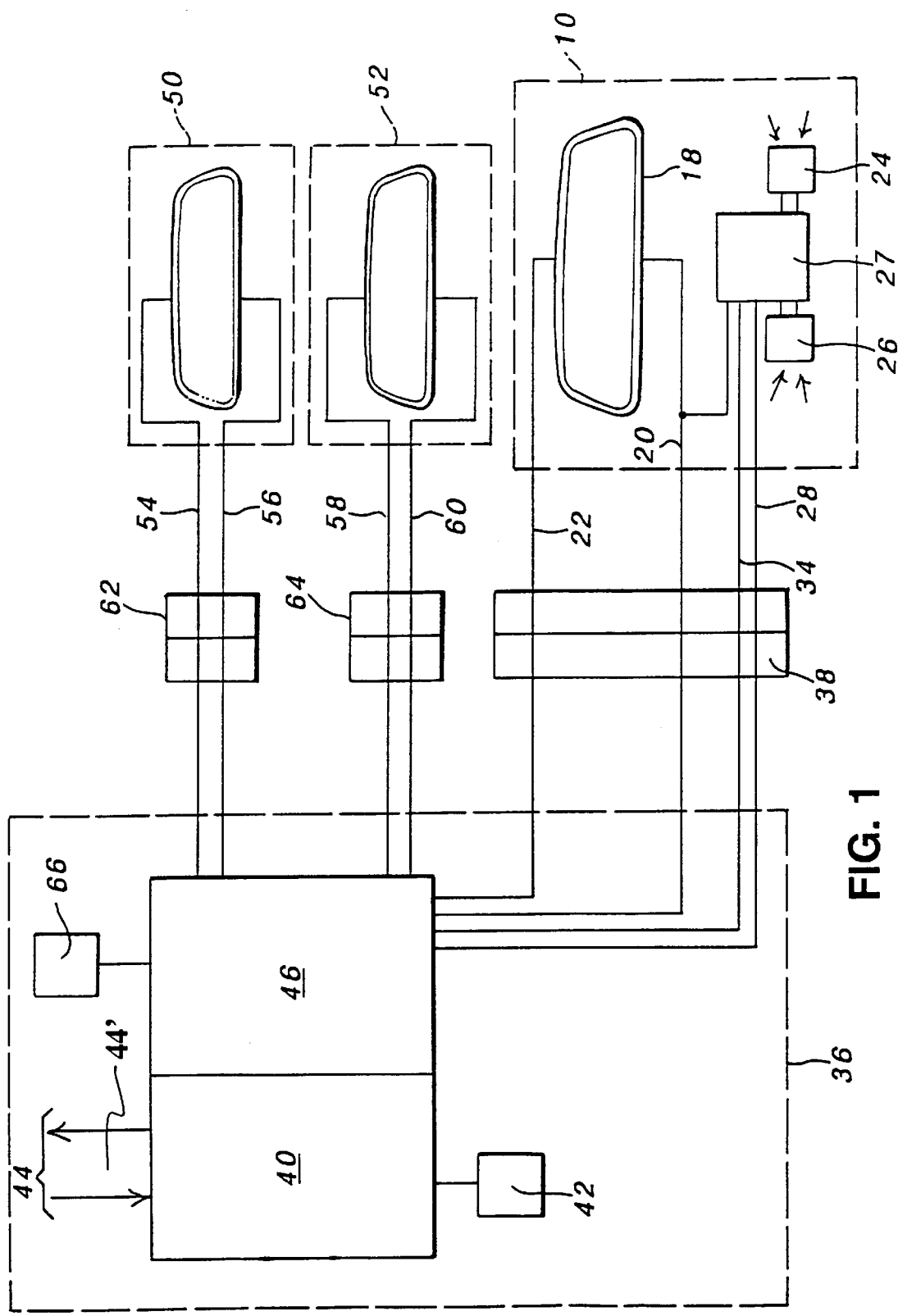
FIG. 1 is a block diagram of an electro-optic rearview mirror system for a vehicle according to an embodiment of the invention.

Referring to the drawings, a vehicle rearview mirror system includes an interior mirror housing 10 mounted in conventional manner via a ball and socket joint 12 to the lower end of a mirror support bracket 14. The upper end of the support bracket 14 is secured to the forward end of a shallow housing (header) 16 mounted on the ceiling of the vehicle behind the mirror housing 10 overhead and centrally between the driver and the front passenger seats. Alternatively the upper end of the bracket 14 can be secured directly to the interior surface of the vehicle windscreen.

The mirror housing 10 contains an electro-optic mirror unit 18 having a ground lead 20 and a voltage supply lead 22. The mirror housing 10 also contains a pair of light sensors 24 and 26 mounted on a PCB 27 and respectively positioned to sense the ambient light levels forwardly and rearwardly of the vehicle through appropriate apertures in the mirror housing in known manner. The light sensors are connected in series between a sensor voltage supply lead 28 and the ground lead 20. A resistor 30 in series with the sensor 24 and a resistor 32 in parallel with the sensor 26 establish appropriate biassing of the sensors 24 and 26 in known manner. A sensor output lead 34 provides a voltage signal which is a function of the ambient light levels forwardly and rearwardly of the vehicle. It will be understood that the particular sensor circuit shown in FIG. 2 is just one a number which could be used, of varying sophistication and complexity, providing one or more sensor outputs as is known in the art.

The support bracket 14 is hollow. The four leads 20, 22, 28 aand 34 enter the lower end of the hollow bracket 14, travel up and emerge from the top end of the bracket 14, and are connected to a PCB 36 mounted in the header 16. A connector 38 at the top end of the bracket 14 permits ready removal and replacement of the mirror housing and bracket without needing to disconnect and reconnect the leads at the PCB 36. Micro-processor-based signal processing and communications circuitry 40, powered by a regulated power supply 42 derived from the vehicle battery, is mounted on the PCB 36. The circuitry 40 is a master controller for many vehicle functions, from which it sends and receives signals via input and output lines 44. To the extent these functions are unrelated to mirror control, they are of no concern to the present invention.

A part 46 of the controller 40 constitutes the control circuitry for the mirror unit 18 (it will be understood that although the mirror control circuitry 46 is shown as a discrete portion of the controller 40, much of it will be shared with other control functions). The mirror control circuitry 46 includes logic circuitry to process the sensor output signal on the lead 34 to determine the appropriate level of mirror reflectivity, and drive circuitry which establishes the resultant drive voltage to be applied via the lead 22 across the electro-optic medium in the mirror unit 18 to set the reflectivity accordingly. Such functions are well understood in the art.

Figure 2:
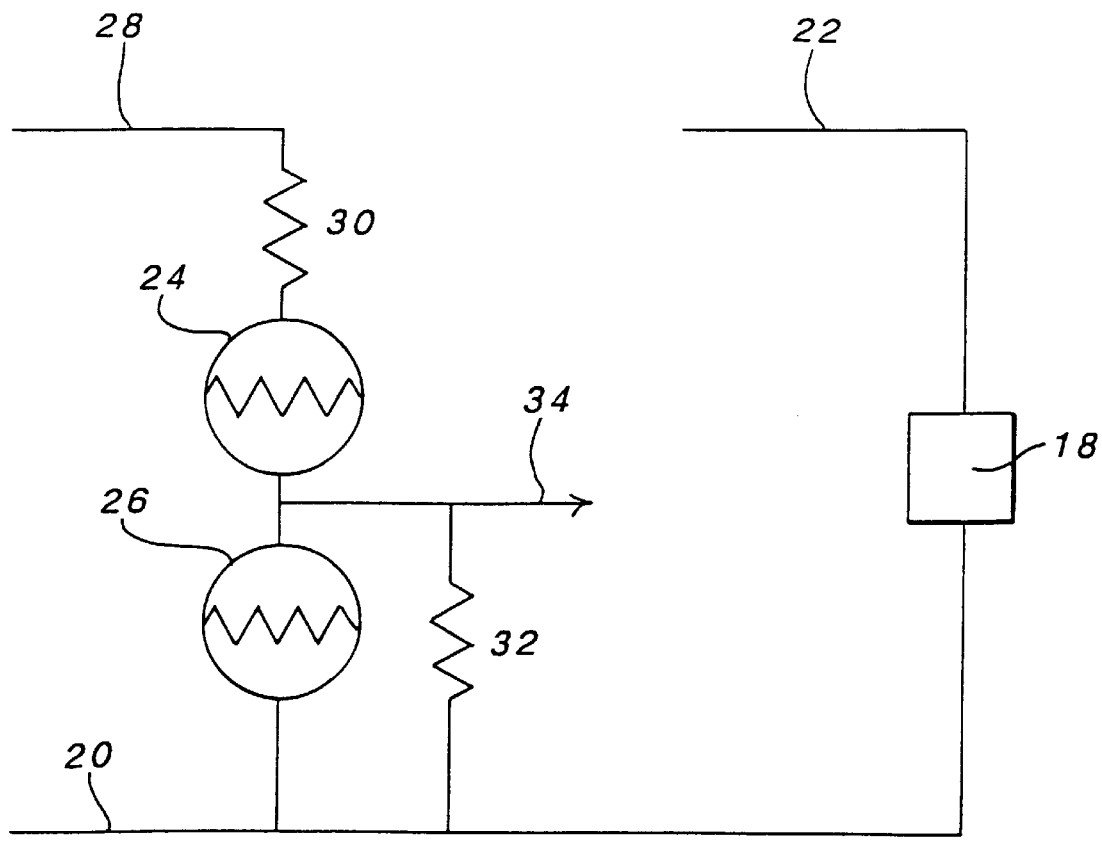
FIG. 2 is a circuit diagram of the components inside the mirror housing in the mirror system of FIG. 1.
Figure 3:
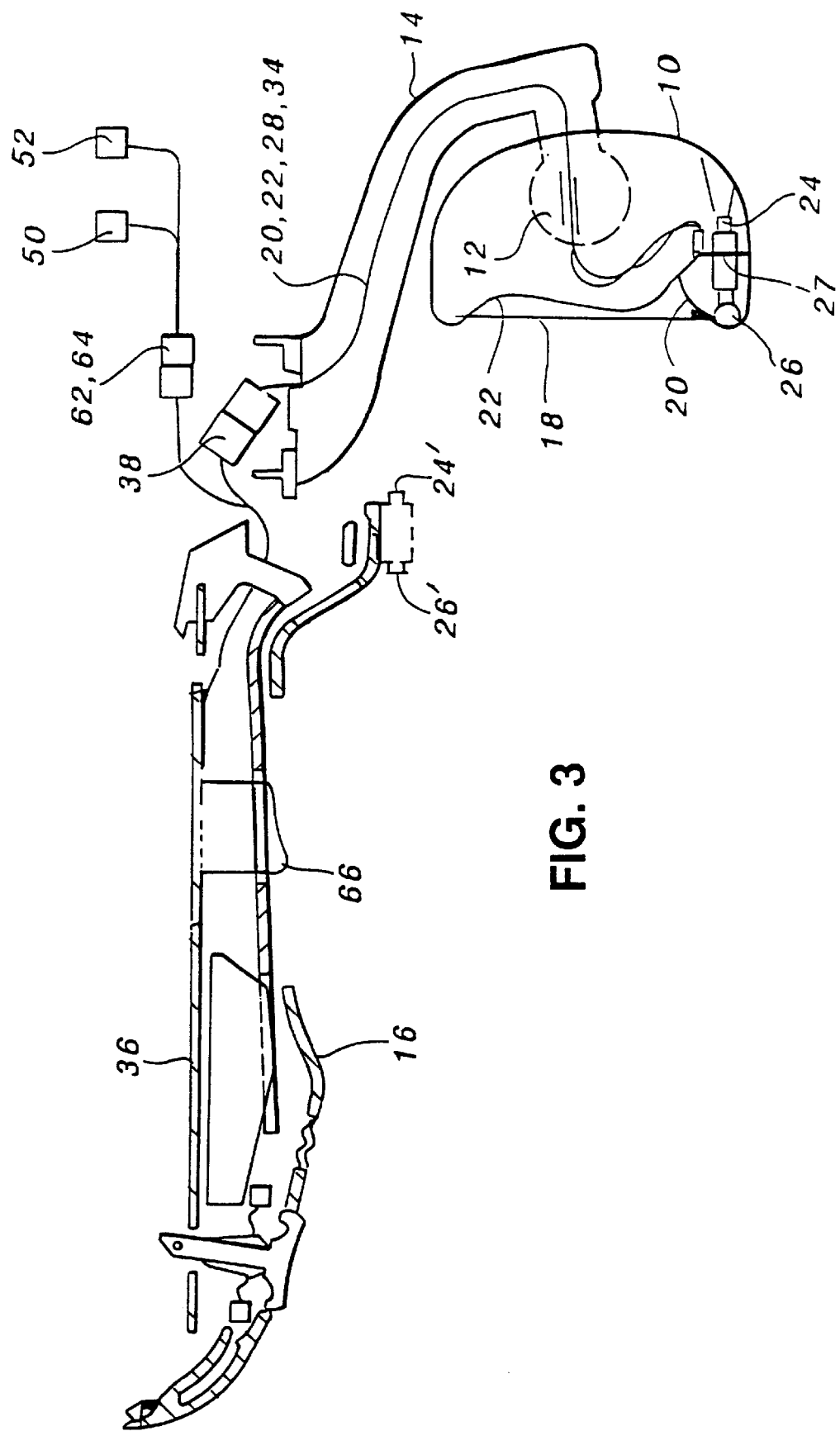
FIG. 3 is cross-sectional view of one example of the physical layout inside a vehicle of the mirror system of FIG. 1.

In the embodiment shown in FIGS. 1 to 3, the mirror control circuitry 46 also controls the reflectivity of a pair of exterior electro-optic mirror assemblies 50 and 52 via pairs of leads 54, 56 and 58, 60 respectively. These mirror assemblies 50 and 52 also have electro-optic mirror units, similar to the element 18, and the voltages on the leads 54 to 60 control the reflectivity thereto in response to the sensor output signal on the lead 34. The leads 54 to 60 are connected from the PCB 36 to the mirror assemblies 50, 52 via connectors 62, 64 to permit ready removal and replacement of the mirror assemblies 50, 52 without needing to disconnect and reconnect the leads at the PCB 36.

The PCB 36 also mounts a mirror control switch 66, accessible from below the header 16, to permit the driver to manually disable the control circuitry 46 if desired, for example when the vehicle is reversing at night and the driver does not wish the reflectivity of the mirror to be reduced. The mirror control switch 60 may alternatively be located at the mirror housing 10. Alternatively, the operation of the control circuitry 46 may be automatically overridden by the controller 40 when the latter determines that the vehicle is in reverse gear, as indicated by a sensor input at 44.

In an alternative embodiment of the invention the sensors 24 and 26 are not located in the mirror housing 10, but are fitted to the forward end of the header 16 at a position where an adequate view of the ambient light levels forwardly and rearwardly of the vehicle can be obtained. This alternate location is indicated in dashed lines at 24', 26' in FIG. 3. This further reduces the complexity of the mirror assembly. The other details of this embodiment are the same as previously described.

The invention is not limited to the embodiment of described and exemplified, which can be amended or modified without departing from the scope of the invention.

What is claimed is:

1. An electro-optic interior rearview mirror system for a vehicle, comprising:
    an interior rearview mirror assembly including an interior electro-optic reflective element and an interior mirror housing for said reflective element;
    said interior mirror assembly including a support for attachment to a portion of the vehicle;
    a control positioned external of said interior mirror housing and electrically connected with said reflective element for varying the reflectance state thereof;
    at least one further mirror assembly mounted on the exterior of the vehicle and containing a further electro-optic reflective element;
    said control including a microprocessor, said microprocessor functioning as a controller of a plurality of vehicle functions, said plurality of functions including at least one function occurring at said interior mirror housing and at least one other function occurring other than at said interior mirror housing, said at least one function occurring at said interior mirror housing including the reflectance state of said electro-optic reflective element, said at least one other vehicle function including the reflectance state of said further electro-optic reflective element; and
    wherein said vehicle includes a vehicle bus and wherein said control connects to said vehicle bus external to said interior mirror housing, said control processing at least one signal related to said at least one other vehicle function, said at least one signal being sent to or received by said microprocessor via said vehicle bus.

2. A rearview mirror system as claimed in claim 1, including electrical leads passing through said support.

3. A rearview mirror system as claimed in claim 1, wherein said portion of the vehicle comprises one of a windshield portion and a header portion.

4. A rearview mirror system as claimed in claim 3, wherein said plurality of vehicle functions includes at least one of a compass display, a navigational display and a sensor for a door lock/unlock system.

5. A rearview mirror system as claimed in claim 3, wherein said control includes a node for said vehicle bus.

6. A rearview mirror system as claimed in claim 1, wherein said control establishes a drive voltage for said further electro-optic reflective element.

7. A rearview mirror system as claimed in claim 1, wherein said interior electro-optic reflective element comprises an electrochromic reflective element.

8. A rearview mirror system as claimed in claim 1 including at least one of a switch and an indicator.

9. An electro-optic interior rearview mirror system for a vehicle, comprising:
- an interior rearview mirror assembly including an interior electro-optic reflective element and an interior mirror housing for said reflective element;
- said interior mirror assembly including a support for attachment to a portion of the vehicle;
- a control positioned external of said interior mirror housing and electrically connected with said reflective element for varying the reflectance state thereof;
- at least one further mirror assembly mounted on the exterior of the vehicle and containing a further electro-optic reflective element;
- said control including a microprocessor, said microprocessor functioning as a controller of a plurality of vehicle functions, said plurality of functions including at least one function occurring at said interior mirror housing and at least one other function occurring other than at said interior mirror housing, said at least one function occurring at said interior mirror housing including the reflectance state of said electro-optic reflective element, said at least one other vehicle function including the reflectance state of said further electro-optic reflective element; and
- wherein said vehicle includes a vehicle bus and wherein said control connects to said vehicle bus external to said interior mirror housing, said control processing at least one signal related to said at least one other vehicle function, said at least one signal being sent to or received by said microprocessor via said vehicle bus; and
- wherein said plurality of vehicle functions includes at least one of a compass display, a navigational display and a sensor for a door lock/unlock system.

10. A rearview mirror system as claimed in claim 9, including electrical leads passing through said support.

11. A rearview mirror system as claimed in claim 9, wherein said control establishes a drive voltage for said further electro-optic reflective element.

12. A rearview mirror system as claimed in claim 9, wherein said interior electro-optic reflective element comprises an electrochromic reflective element.

13. A rearview mirror system as claimed in claim 9, wherein said portion of the vehicle comprises one of a windshield portion and a header portion.

14. A rearview mirror system as claimed in claim 9, wherein said control includes a node for said vehicle bus.

15. A rearview mirror system as claimed in claim 9 including at least one of a switch and an indicator.

16. An electro-optic interior rearview mirror system for a vehicle, comprising:
- an interior rearview mirror assembly including an interior electro-optic reflective element and an interior mirror housing for said reflective element;
- said interior mirror assembly including a support for attachment to a portion of the vehicle;
- a control positioned external of said interior mirror housing and electrically connected with said reflective element for varying the reflectance state thereof;
- at least one further mirror assembly mounted on the exterior of the vehicle and containing a further electro-optic reflective element;
- said control including a microprocessor, said microprocessor functioning as a controller of a plurality of vehicle functions, said plurality of functions including at least one function occurring at said interior mirror housing and at least one other function occurring other than at said interior mirror housing, said at least one function occurring at said interior mirror housing including the reflectance state of said electro-optic reflective element, said at least one other vehicle function including the reflectance state of said further electro-optic reflective element; and
- wherein said vehicle includes a vehicle bus and wherein said control connects to said vehicle bus external to said interior mirror housing, said control processing at least one signal related to said at least one other vehicle function, said at least one signal being sent to or received by said microprocessor via said vehicle bus; and
- wherein said control includes a node for said vehicle bus.

17. A rearview mirror system as claimed in claim 16, including electrical leads passing through said support.

18. A rearview mirror system as claimed in claim 16, wherein said portion of the vehicle comprises one of a windshield portion and a header portion.

19. A rearview mirror system as claimed in claim 16, wherein said control establishes a drive voltage for said further electro-optic reflective element.

20. A rearview mirror system as claimed in claim 16, wherein said interior electro-optic reflective element comprises an electrochromic reflective element.

21. A rearview mirror system as claimed in claim 16, wherein said plurality of vehicle functions includes at least one of a compass display, a navigational display and a sensor for a door lock/unlock system.

22. A rearview mirror system as claimed in claim 16, wherein said plurality of vehicle functions comprises a compass display.

23. A rearview mirror system as claimed in claim 16 including at least one of a switch and an indicator.

* * * * *